April 12, 1960
A. KREMSKI ET AL
2,932,111
FISHING APPARATUS
Filed Sept. 13, 1957
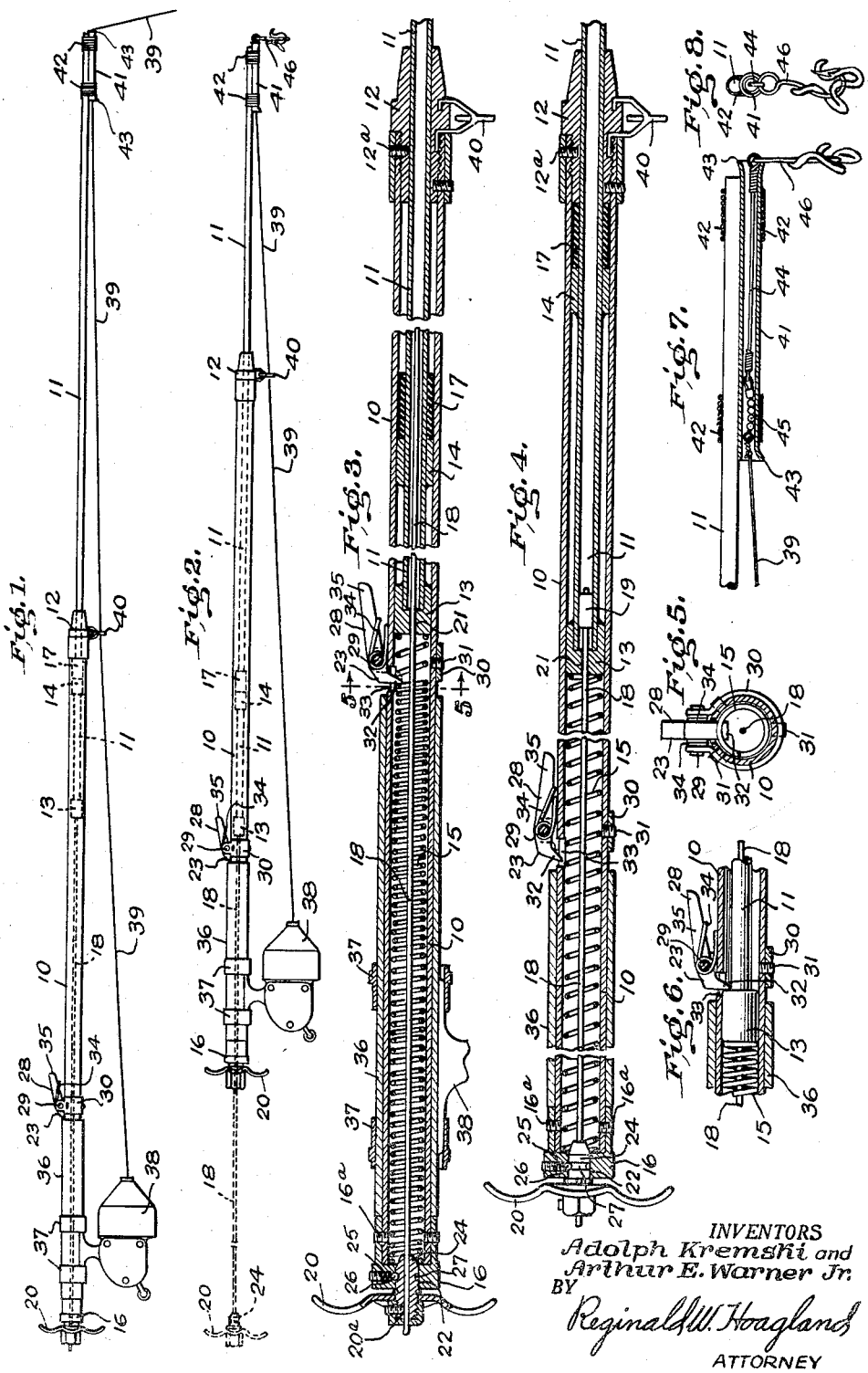
INVENTORS
Adolph Kremski and
Arthur E. Warner Jr.
BY
Reginald W. Hoagland
ATTORNEY

United States Patent Office

2,932,111
FISHING APPARATUS

Adolph Kremski, Flint, and Arthur E. Warner, Jr., Flushing, Mich.

Application September 13, 1957, Serial No. 683,734

4 Claims. (Cl. 43—19)

The present invention relates to fishing devices, and more particularly to fishing rods which have a source of power incorporated therein for propelling fishing lures during a casting operation and which are of a general nature similar to that shown and described in a pending application, Serial No. 522,071, filed on July 14, 1955, now Patent No. 2,823,482, by a co-inventor of the present application.

It therefore is an object of the present invention to provide a fishing apparatus of the above-indicated character that does not require the customery swinging operation of the apparatus in order to cast a bait, and thereby eliminate to a great extent the entangling of the line in bushes and overhanging limbs of trees when fishing along the side of a stream and the crossing of the line with the lines of other fishermen when fishing from a crowded boat.

Another object of the invention is to provide a gun type fishing rod that is pointed in the direction of the location where it is desired to cast a bait, and by releasing a source of energy stored within the rod, the bait on a line unreeled from the rod will be propelled with accuracy to the location selected.

Another object of the invention is to provide a fishing rod of the above-indicated character which can also be used in the normal conventional manner for casting lures.

A further object of the invention is the provision of a pair of hollow rod sections constructed and arranged in a manner whereby one telescopes within the other and is propelled outwardly of the other by a source of power within one section for casting a lure engaged by the propelled section.

Still another object of the invention is to provide, in a device of the character outlined in the preceding object, a novel spring arrangement for supplying power to actuate one rod section relative to the other rod section in conjunction with a novel cocking and trigger mechanism for compressing and releasing the spring power.

A still further object of the invention is to provide, in a device as set forth in the preceding object, a plurality of different cocking positions for the spring-propelled rod section in order that different amounts of energy may be stored for shooting lures different distances.

Still another object of the invention is the provision, in a lure-shooting device of the class above-set-forth, of a novel tip structure on the rod section that is propelled outwardly for efficiently transmitting the force of outward motion of said rod section to the lure.

It is also an object of the invention to provide a device of the above-indicated character which is simple and substantial in construction, economical to manufacture, and thoroughly efficient and practical in use.

Other and further objects of the invention will become apparent from a reading of the following specification taken in conjunction with the drawings in which:

Figure 1 is a side elevation of the improved rod in extended position for use as a conventional fishing rod and after a lure has been cast;

Figure 2 is a also a side elevation showing the rod in cocked position with the tip section retracted, and showing in dotted lines, the position of the cocking mechanism during the act of a cocking operation;

Figure 3 is a fragmentary enlarged longitudinal sectional view with parts broken away and in the position shown in Figure 2;

Figure 4 is a similar sectional view with parts shown in the position after a lure has been cast;

Figure 5 is a cross section taken on line 5—5 of Figure 3;

Figure 6 is a fragmentary section and elevation showing a different cocked position of the device from that shown in Figure 3;

Figure 7 is also a section and elevation of the tip end of the propelled rod section; and Figure 8 is an end elevation of the tip of the rod section shown in Figure 7.

Referring more in detail to the accompanying drawing, the numerals 10 and 11 designate a pair of thin-walled cylindrical tubular rod sections of lightweight material and of different diameters for telescoping a portion of one section within the other. The larger, or butt, section 10 is constructed of a substantially stiff material and has a bushing 12 secured, as at 12a, to its forward end in which the smaller, or tip, section 11, which is of a more flexible nature, is mounted for longitudinal slidable movement. Within the butt section 10 and fixed to the inner or rear end of the smaller tip section 11, in any approved manner, is a head 13, while spaced forwardly of said head and also within the butt section and fixed to said tip section is a collar 14. Both the head 13 and collar 14 are in slidable engagement with the inner cylindrical surface of the butt section 10 and together with the bushing 12 support the smaller tip section 11 axially of the larger butt section 10.

A coil spring 15 of compression type and also within the butt section 10 bears at its opposite ends against the inner end of the head 13 and the bottom of a butt cap 16 secured, as at 16a, to the inner end of said butt section, so as to apply an outward or forward thrust to the smaller tip section 11 when released and when the butt section is held against movement in the hands of a fisherman. A rubber sleeve 17, tight about the tubular tip section 11 and pressing against the forward end of the fixed collar 14, is forced into abutting engagement with the inner end of the bushing 12 to abruptly limit such forward movement of said tip section and to act as a shock absorber.

A stiff wire or cable 18 having an enlargement 19 in the form of a collar fixed to its forward end for engaging the head 13 and a handle 20 rotatably mounted, as at 20a, on its rear or opposite end, extends lengthwise through the spring 15 and through aligned openings 21 and 22 in the head 13 and bottom wall 16, respectively, is used to manually compress the spring 15 by exerting a rearward pull on the handle, there being a cocking and trigger mechanism 23 supported on the butt section 10 for engaging between the coils of the spring or behind the head 13 to hold the spring compressed and the fishing rod in cocked position. The opening 21 in the head 13 is of a size just slightly larger than the diameter of the wire 18 and considerably smaller than the enlargement 19, which is slidable in the inner end portion of the hollow tip section 11. Also, the wire 18 is of a length so that the enlargement 19 is forwardly of engagement with the head 13 when the handle 20 has been returned to its initial position after cocking and when the tip section 11 is in its forwardmost position, as shown in Figure 4.

A cylindrical pilot pin 24 on which the handle 20 is rotatably supported and through which the wire 18 extends and is secured, is slidably received in the opening 22 in the bottom of the cap 16. A small spring 25 contained in a radial opening in the bottom wall of the cap yieldably projects a ball 26 partially into the pin-receiving opening 22 and into an annular groove 27 in the pin 24 for yieldably retaining the pin in the opening, thus holding the handle 20 in retracted position while fishing and holding the enlargement 19 in its forwardmost position during propelling of the tip section forwardly.

The cocking and trigger element 23 is in the form of a lever 28 pivoted intermediate its ends on a pin 29 carried by the ends of a substantially U-shaped bracket 30 that straddles and is attached to the butt section 10 by a plurality of small screws 31. The lever 28 has on one end a wedgelike detent 32 that projects into the tubular butt section through an opening 33 in the wall thereof for engaging between different coils of the spring 15, as shown in Figure 3, or for engaging behind the head 13, as shown in Figure 6, according to the amount of tension desired in the compression of the spring. A small spring 34 coiled about the pivot pin 29 and with legs thereof pressing on the butt section and under the other or finger-engaging end 35 of the lever normally holds the detent 32 in the path of movement of the spring 15 and it is only necessary to depress the end 35 of the lever in order to release said spring and propell the tip section 11 forwardly.

Slid over the rear end portion of the tubular butt section 10 and attached thereto in any suitable manner is a cylindrical hand grip 36 of cork, or the like, which in turn has positioned there about a pair of sliding ring clamps 37 for attaching a reel 38 to the rod. While the reel shown is of the spinning type and is preferred because of no mechanical drag when the line is playing out from the stationary spool, it is to be understood that other types of reels may be employed. The line 39, which is wound upon the spool of the reel 38, extends forwardly through a guide ring 40 fixed to one side of the bushing 12 at the forward end of the butt section 10 and then through a tubelike tip guide 41 secured to one side of the forward end of the tip section 11 by cord wrappings 42 around both said tubelike tip guide and said rod section.

As shown in Figures 7 and 8, the tubelike tip guide 41 is cylindrical, is flared at opposite ends, as at 43, and is of a length equal to at least that of a stiff wire leader 44 which may be tied directly or indirectly through a swivel 45 to the end of the line. The tip guide 41 is of a diameter to permit free passage of the leader and swivel therethrough, but is of a lesser diameter than either the eye of a bait-carrying hook 46 or an artificial lure whichever is being used and is connected to the forward end of the leader. It can be seen that when winding the line 39 on the spool of the reel 38, the swivel 45 and stiff leader 44 will be pulled into the tubularlike tip guide 41 and that the eye on the hook 46, due to its size when engaging said tip, will prevent further winding in of the line.

It will further be observed that when holding the rod in any position other than that of being pointed downwardly, preparatory to casting the bait, the weight of the bait will not exert an outward pull on the line from the reel because of the angle of the stiff leader 44 within the tubelike tip guide 41 and the direction of application of the pulling force produced by the weight of the bait. This tends to retain the bait in close contact position with the end of the tubelike tip guide 41 so that the full outward thrust of the tip section 11 is applied to the bait upon release of the spring 15. When the tubular tip section 11 is arrested in its forward movement by the shock-absorbing rubber sleeve 17 engaging the bushing 12, the bait will continue to move forwardly by the momentum it gains while moved forwardly with the tip section. By having the detent 32 of the cocking and trigger mechanism 23 engageable between different coils of the spring 15, it is possible to store different amounts of spring pressure for propelling the bait different distances in advance of the rod. Thus, it can be seen that by pointing the rod in the direction in which it is desired to cast the bait, the bait can be placed at such a location with considerable accuracy upon release of the spring pressure by the cocking of the trigger mechanism.

It is obvious that various changes and modifications may be made in the details of construction and design of the above specifically described embodiment of the invention without departing from the spirit and full intendment of the invention.

What is claimed is:

1. A fishing apparatus comprising a rod consisting of a tubular butt section, a tubular tip section of smaller diameter than said butt section telescopically mounted in said butt section for movement to an extended position whereby the major portion of said tip section is outwardly of said butt section, or to a retracted position whereby the major portion of said tip section is within said butt section, a head fixed on the inner end of said tip section and in slidable engagement with the inner surface of said butt section, a bushing on the outer end of said butt section through which said tip section slides, a butt cap on the inner end of said butt section, a compression coil spring within said butt section and bearing at its opposite ends against said butt cap and the rear end of said head, said butt cap and said head having aligned openings therethrough, a flexible retracting wire extending through said coil spring and extended through the aligned openings in said butt section and head, an enlargement on the forward end of said retracting wire and disposed within said tubular tip section and engageable with said head, a handle on the rear end of said retracting wire so as to retract said tip section and compress said spring upon the exertion of a rearward pull to said handle, a cocking and trigger mechanism mounted on said tubular butt section and engageable with said head for holding said tip section in retracted position and for releasing said tip section, a reel mounted on said butt section, a line guide ring fixed to the forward end portion of said butt section, a sleevelike line guide at the forward end of said tip section, a line wound upon said reel and extending through said line guides, and a bait object on said line and forwardly of said sleevelike line guide, said sleevelike line guide having an inner diameter less than the cross sectional size of said bait object.

2. A fishing apparatus as defined in claim 1 wherein a cylindrical pilot pin is fixed to the rearward end of the retracting wire and is of a diameter for reception into and out of the opening in the butt cap, and retention means on said butt cap and engaging said pilot pin so as to yieldably hold said pilot pin in said opening.

3. A fishing apparatus as defined in claim 1 wherein said flexible retracting wire is of sufficient stiffness and of a length to position the enlargement on its forward end in advance of the head on the tip section when the wire is returned from a retracted position and said tip section is in its forwardmost position.

4. A fishing apparatus comprising a rod consisting of a tubular butt section, a tip section of smaller diameter than said butt section telescopically mounted in said butt section for movement to an extended position whereby the major portion of said tip section is outwardly of said butt section, or to a retracted position whereby the major portion of said tip section is within said butt section, a butt cap on the inner end of said butt section, a compression coil spring within said butt section and bearing at its opposite ends against said butt cap and the rear end of said tip section, said butt cap having an opening therethrough, a flexible retracting wire extending through said coil spring and the opening in said butt section and engageable with the tip section, a handle on the rear end of said retracting wire so as to retract said tip section and compress said spring upon the exertion of a rearward pull to said handle, a cocking and trigger mechanism mounted on said tubular butt section and engageable with said spring for holding said spring compressed and for releasing the same, a reel mounted on said butt section, a line guide fixed to the forward end portion of each rod section, a line wound upon said reel and extending through said line guides, a bait object on said line and forwardly of said tip section, said line guide on said tip section having an inner diameter less than the cross sectional size of said bait object so as to engage and propel said bait object forwardly upon forward movement of said tip section, a pilot pin fixed to the rearward end of said retracting wire and having the handle rotatably mounted thereon, said pilot pin being cylindrical and of a diameter for reception into and out of the opening in said butt cap, said pilot pin having an annular groove in its cylindrical surface, and a spring-urged ball carried by said butt cap and adapted to engage in said annular groove for yieldably holding said pilot pin in said opening.

References Cited in the file of this patent

UNITED STATES PATENTS

| | | |
|---|---|---|
| 1,062,816 | Burwell | May 27, 1913 |
| 1,473,507 | Obermaier | Nov. 6, 1923 |
| 2,569,604 | Hall | Oct. 2, 1951 |
| 2,584,678 | Dewey | Feb. 5, 1952 |